(12) United States Patent
Weatherspoon, Jr. et al.

(10) Patent No.: US 12,399,082 B2
(45) Date of Patent: Aug. 26, 2025

(54) GEAR IDENTIFICATION TOOL FOR VEHICLE PARTS

(71) Applicant: Ford Global Technologies, LLC, Dearborn, MI (US)

(72) Inventors: Russell Lee Weatherspoon, Jr., Holly, MI (US); Mark David Hock, Shelby Township, MI (US); Patrice Michelle Stringer, Detroit, MI (US); David Watkins, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 18/320,743

(22) Filed: May 19, 2023

(65) Prior Publication Data

US 2024/0385080 A1    Nov. 21, 2024

(51) Int. Cl.
*G01M 13/021*    (2019.01)

(52) U.S. Cl.
CPC .................................. *G01M 13/021* (2013.01)

(58) Field of Classification Search
CPC ..... G01M 13/021; F16H 55/17; G01B 5/0025
See application file for complete search history.

(56) References Cited

U.S. PATENT DOCUMENTS

| | | | |
|---|---|---|---|
| 3,167,867 A | | 2/1965 | Reef |
| 4,261,198 A | * | 4/1981 | Moore ................ G01M 13/021 73/162 |
| 4,831,872 A | * | 5/1989 | Huang ................ G01M 13/021 702/167 |
| 5,237,862 A | * | 8/1993 | Mangrulkar ........... G01M 15/11 73/114.04 |
| 5,497,844 A | * | 3/1996 | Fritzinger .............. A63G 25/00 74/462 |
| 5,513,442 A | * | 5/1996 | Flair ................... G01M 13/021 33/501.13 |
| 6,040,910 A | * | 3/2000 | Wu ..................... G01B 11/2527 356/613 |
| 6,711,855 B1 | * | 3/2004 | Daniels .................. E05F 15/63 49/342 |
| 9,945,447 B2 | * | 4/2018 | Telep .................... F16H 57/082 |
| 2011/0030489 A1 | * | 2/2011 | Chen ....................... F16H 55/18 74/440 |
| 2013/0133168 A1 | * | 5/2013 | Yamaguchi ......... G01B 11/2416 29/284 |
| 2015/0081083 A1 | * | 3/2015 | Kreschel ............. G05B 19/182 33/501.7 |

(Continued)

FOREIGN PATENT DOCUMENTS

| | | | | |
|---|---|---|---|---|
| CN | 115342713 A | * | 11/2022 | ........... G01B 5/0002 |
| FR | 1322503 | | 3/1963 | |

*Primary Examiner* — David J Bolduc
(74) *Attorney, Agent, or Firm* — Burris Law, PLLC

(57) ABSTRACT

A gear identification tool includes a segmented assembly including a first body and a second body movable relative to each other. The first and second bodies are coupled to each other by an attachment structure. The first body includes a plurality of first gear teeth configured to mesh with first predetermined gear teeth of a first gear. The first gear teeth have a first teeth profile. The second body includes a plurality of second gear teeth configured to mesh with second predetermined gear teeth of a second gear. The second gear teeth have a second teeth profile that is different than the first teeth profile.

20 Claims, 8 Drawing Sheets

(56) References Cited

U.S. PATENT DOCUMENTS

| | | | | |
|---|---|---|---|---|
| 2015/0143890 A1* | 5/2015 | Meduru | ............... | G01M 13/021 |
| | | | | 73/162 |
| 2015/0338201 A1* | 11/2015 | Wuerfel | ................ | B23F 23/006 |
| | | | | 33/504 |
| 2017/0167589 A1* | 6/2017 | Berlinger, Jr. | ............ | F16H 1/06 |
| 2020/0368835 A1* | 11/2020 | Huber | ................ | G05B 19/4065 |
| 2022/0003177 A1* | 1/2022 | Joseph | .................. | F02D 41/009 |

* cited by examiner

GEAR IDENTIFICATION TOOL FOR VEHICLE PARTS

FIELD

The present disclosure relates to a gear identification tool for a part, and more specifically, a gear identification tool for a gear.

BACKGROUND

The statements in this section merely provide background information related to the present disclosure and may not constitute prior art.

During the manufacturing process of vehicle parts (e.g., axle gears, transmission gears, splined shafts), similar variations of vehicle parts may be produced in the same production line, for example, with varying levels of completeness, which can make it challenging for an operator of the line to identify the parts from each other. In some forms, teeth of the vehicle parts are counted to identify the vehicle parts from each other. However, counting teeth of vehicle parts can be a lengthy process as some vehicle parts have a large number of teeth (e.g., some vehicle parts contain 40 or more teeth). Furthermore, some vehicle parts have the same number of teeth, which may cause confusion among the line operators.

The teachings of the present disclosure address these and other issues with identifying vehicle parts during the manufacturing process.

SUMMARY

This section provides a general summary of the disclosure and is not a comprehensive disclosure of its full scope or all of its features.

In one form, the present disclosure provides a gear identification tool that includes a segmented assembly including a first body and a second body movable relative to each other. The first and second bodies are coupled to each other by a first attachment structure. The first body includes a plurality of first gear teeth configured to mesh with first predetermined gear teeth of a first gear. The first gear teeth have a first teeth profile. The second body includes a plurality of second gear teeth configured to mesh with second predetermined gear teeth of a second gear. The second gear teeth have a second teeth profile that is different than the first teeth profile.

In variations of the gear identification tool of the above paragraph, which can be implemented individually or in any combination: the first body defines a first internal slot and a first aperture in communication with the first internal slot, the first aperture opens through a first side of the first body; the second body defines a second internal slot and a second aperture in communication with the second internal slot, the second aperture opens through a second side of the second body; the first attachment structure extends between the first side of the first body and the second side of the second body; the first attachment structure permits the first and second bodies to move in a first direction relative to each other and inhibits the first and second bodies from moving in a second direction relative to each other, the second direction being perpendicular to the first direction; the first attachment structure permits the first and second bodies to move within a predetermined distance relative to each other; the first attachment structure includes a first nut located in a first internal slot of the first body, a second nut located in a second internal slot of the second body, and a shaft secured to the first and second nuts; the first attachment structure is a unitized structure; the segmented assembly includes a third body coupled to the second body by a second attachment structure, the third body is permitted to move relative to the first and second bodies; the third body includes a plurality of third gear teeth configured to mesh with third predetermined gear teeth of a third gear, the third gear teeth having a third teeth profile that is different than the first and second teeth profiles; the first body has a first side including the first gear teeth and a second side opposite the first side, the second side comprising a window that provides access to the first teeth; the segmented assembly has an arcuate profile disposed about a central axis, the first body extending a first angle relative to the central axis and the second body extending a second angle relative to the central axis; and the first and second gear teeth are face gear teeth.

In another form, the present disclosure provides a gear identification tool that includes a segmented assembly including a plurality of bodies coupled to each other by attachment structures and movable relative to each other. Each body includes a plurality of gear teeth configured to mesh with predetermined gear teeth of a respective gear. Each body includes an internal slot and an aperture in communication with the internal slot. The aperture opens through a first side of the body. One attachment structure of the attachment structures includes a first nut located in the internal slot of one body of the plurality of bodies, a second nut located in the internal slot of another body of the plurality of bodies, and a shaft secured to the first and second nuts.

In variations of the gear identification tool of the above paragraph, which can be implemented individually or in any combination: the gear teeth of the one body of the plurality of bodies have a first teeth profile and the gear teeth of the another body of the plurality of bodies have a second teeth profile, the first gear teeth profile is different than the second teeth profile; the one attachment structure permits the one body and the another body to move within a predetermined distance relative to each other; the one attachment structure permits the one body and the another body to move in a first direction relative to each other and inhibits the one body and the another body from moving in a second direction relative to each other, the second direction being perpendicular to the first direction; the one body has a second side including the gear teeth and a third side opposite the second side, the third side comprises a window that provides access to the gear teeth; the segmented assembly has an arcuate profile disposed about a central axis, the one body extending a first angle relative to the central axis and the another body extending a second angle relative to the central axis; and the segmented assembly includes at least four bodies.

In yet another form, the present disclosure provides a gear identification tool that includes a segmented assembly that includes a plurality of bodies and attachment structures. The plurality of bodies are movable relative to each other. Each body includes a plurality of gear teeth having a gear teeth profile that is different from the gear teeth profile of the other bodies of the plurality of bodies. Each body also includes an internal slot and an aperture in communication with the internal slot. The aperture opens through a first side of the body. The attachment structures couple the plurality of bodies to each other. One attachment structure of the attachment structures includes a first nut located in the internal slot of one body of the plurality of bodies, a second nut located in the internal slot of another body of the plurality of bodies, and a shaft secured to the first and second nuts. The one attachment structure permits the one body and the another body to move in an axial direction relative to each other and inhibits the one body and the another body from moving in a radial direction relative to each other. Each of the plurality of bodies has a second side including the gear teeth and a third side opposite the second side. The third side includes a window that provides access to the gear teeth.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
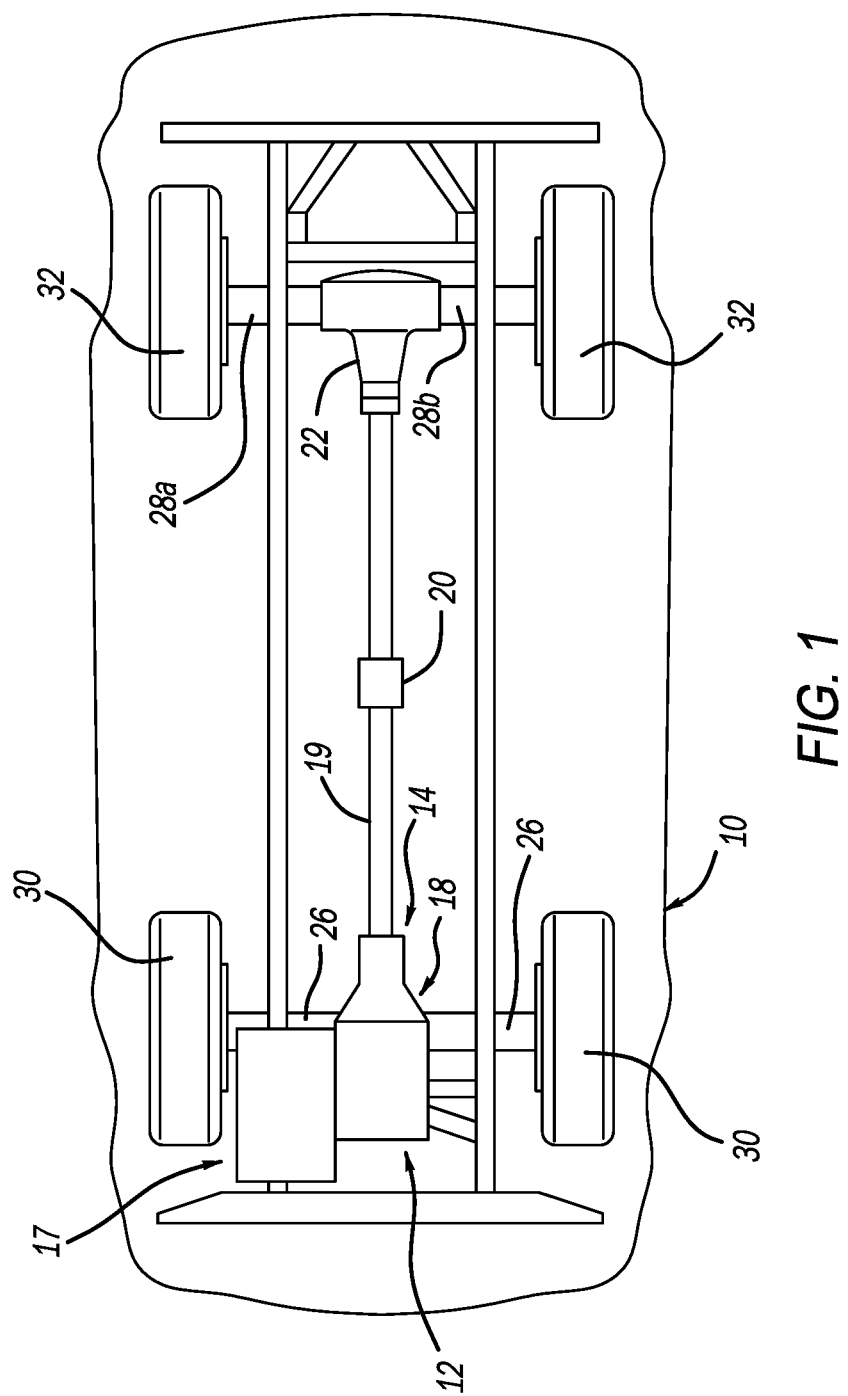
FIG. 1 is a bottom view of a vehicle having a transmission and axle shafts assembled according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a powertrain system 12 and a drivetrain system 14. The systems 12, 14 can be conventional systems, for example. In the particular configuration shown in FIG. 1, the powertrain system 12 includes, inter alia, an engine 17 and a transmission 18. The drivetrain system 14 includes, inter alia, a propeller shaft 19, a center differential 20, a rear differential 22, a pair of front shafts or axles 26, and a pair of rear shafts or axles 28a, 28b. Rotary power generated by the powertrain system 12 is transmitted to the drivetrain system 14. That is, rotary power generated by the powertrain system 12 is transmitted to the pair of front axles 26 to drive a set of front wheels 30. Similarly, rotary power generated by the powertrain system 12 is transmitted to the pair of rear axles 28a, 28b (via the propeller shaft 19, the center differential 20 and the rear differential 22) to drive a set of rear wheels 32. In some forms, the vehicle 10 can be an electric vehicle such as a battery electric vehicle (BEV), wherein drive wheels (not shown) are driven by electric motors (not shown) that receive power from a battery pack (not shown). In other examples, the vehicle 10 may be a hybrid electric vehicle (HEV), a plug-in electric vehicle (PHEV), or a fuel cell vehicle, among others.

The differential 22 may be any suitable type of differential. In one form, the differential 22 has a planetary differential gearset and include, inter alia, a driveshaft (not shown), a housing (not shown), a ring gear (not shown), one or more planet gears (not shown), first and second side gears (not shown), and a clutch (not shown). An input gear (not shown) is connected to the driveshaft. The input gear is a separate component that is secured to the driveshaft or may be an integral part of the driveshaft. The input gear is configured to mesh with the ring gear. The planet gears are connected to the ring gear and meshes with the first and second side gears. The first side gear is connected to the rear shaft 28a and the second side gear is connected to the rear shaft 28b. The first side gear is a separate component that is secured to the shaft 28a or may be an integral part of the first shaft 28a. Similarly, the second side gear is a separate component that is secured to the second shaft 28b or may be an integral part of the second shaft 28b.

The clutch (not shown) can be any suitable type of clutch that is operable to selectively permit or inhibit relative rotation between the first and second shafts 28a, 28b. In one form, the clutch (not shown) includes a set of plates (not shown) associated with (e.g., secured to) the housing (not shown) and a set of discs (not shown) associated with (e.g., secured to) at least one of the first and second shafts 28a, 28b. When the set of plates and the set of discs are disengaged from each other, the differential 22 is in a first differential mode and acts as an open differential (i.e., the shafts 28a, 28b are allowed to rotate at different speeds relative to each other). When the set of plates and the set of discs are engaged with each other, the differential 22 is in the second differential mode and acts as a limited slip differential (i.e., the differential 22 inhibits relative rotation between the shafts 28a, 28b). It should be understood that although the differential 22 is described above as a clutch-type limited slip differential, the differential 22 may be other suitable differentials.

With reference to FIGS. 2-6, a gear identification tool 34 is provided for identifying different vehicle parts or components having teeth, for example. For example, during the manufacturing process, similar variations of vehicle parts (e.g., axle gears, transmission gears, splined shafts) may be produced in the same production line, for example, with varying levels of completeness, which can make it challenging for an operator of the line to identify the parts from each other. The gear identification tool 34 may assist the operator in identifying and sorting a plurality of different vehicle parts from the same production line.

The gear identification tool 34 can be made out of a metal material, a plastic material, a composite material, an elastomeric material (e.g., rubber), or any other suitable material. The gear identification tool 34 can be manufactured by an additive manufacturing process (3D printing). The manufacturing process can include laser sintering, for example, that can generally include a laser, a means for applying subsequent layers of powdered sintering material (e.g., metal powder), and a controller that controls operation of the laser and the amount and timing of the deposition of the powder. It should be understood that other 3D printing/additive manufacturing methods may be employed, along with a variety of different materials, while remaining within the scope of the present disclosure.

Figure 5:
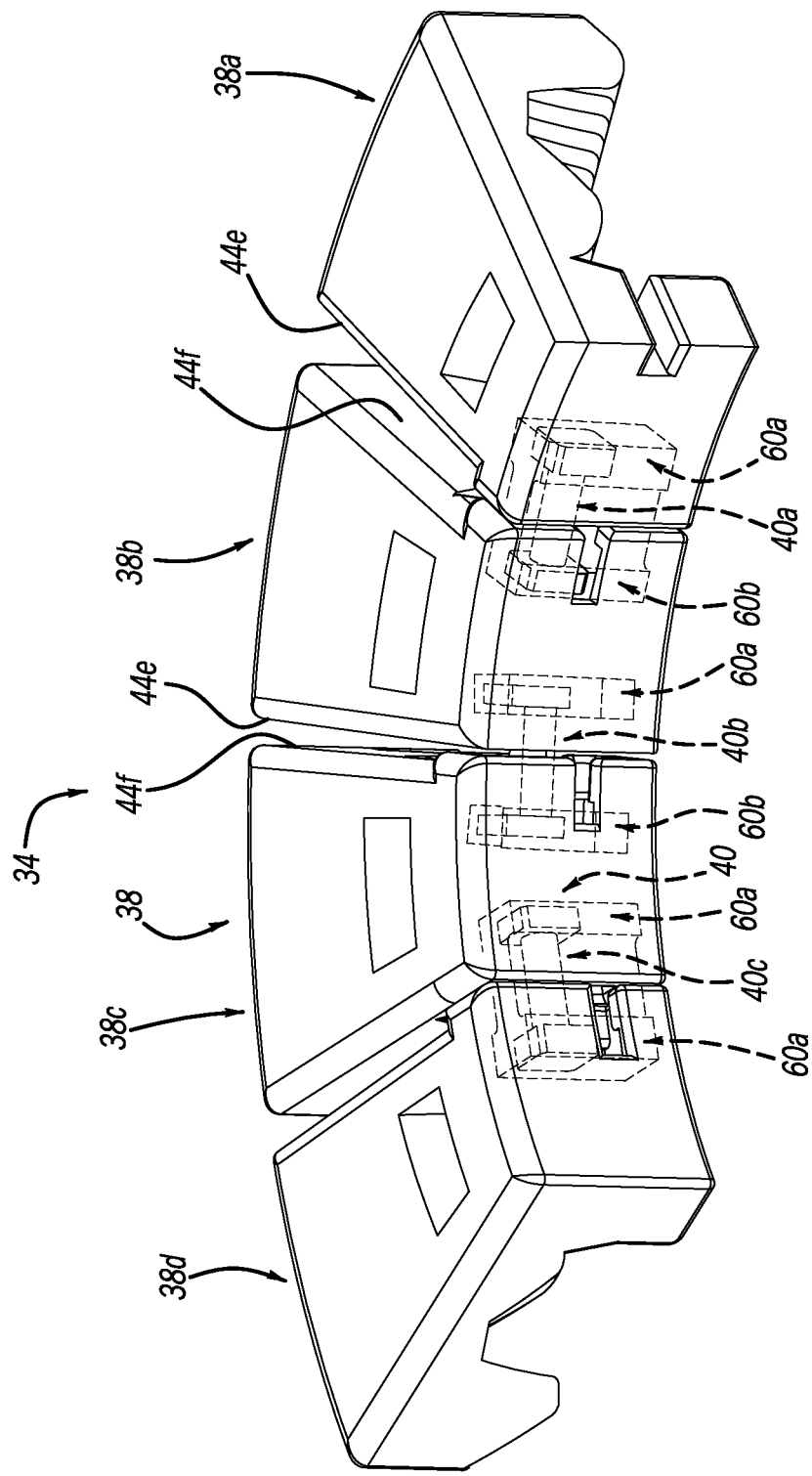
FIG. 5 is a perspective view of a portion of the gear identification tool of FIG. 2 with attachment structures shown in hidden lines.
Figure 6:
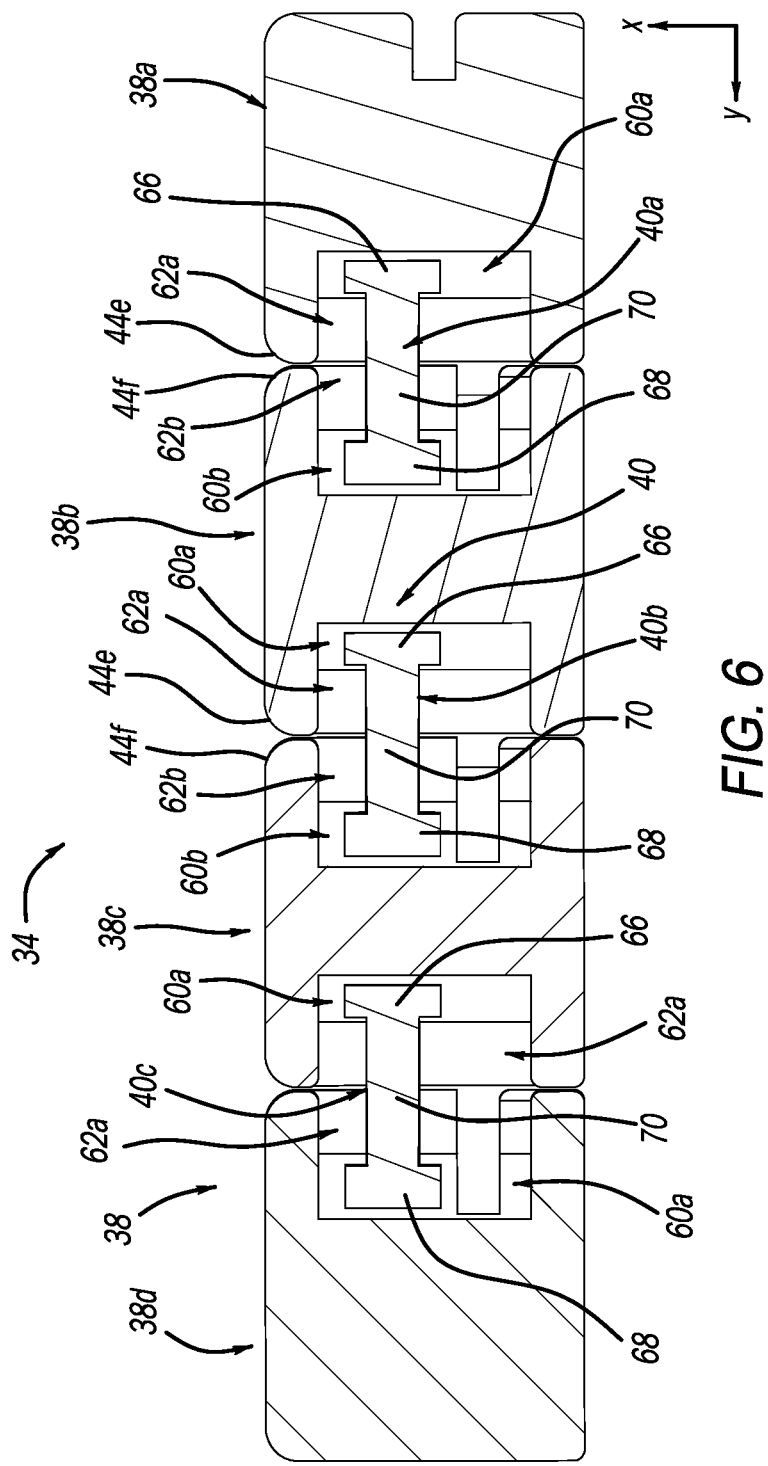
FIG. 6 is a cross-sectional view of a portion of the gear identification tool of FIG. 2.

In the example illustrated, the gear identification tool 34 is a segmented assembly having an arcuate profile and including a plurality of bodies 38a, 38b, 38c, 38d (together referred to as the bodies 38) and attachment structures 40a, 40b, 40c (FIGS. 5 and 6; together referred to as the attachment structures 40). In some forms, the segmented assembly 36 may have a linear profile, a circular profile, or any other suitable profile that corresponds to the profile of the parts being identified. The bodies 38 are coupled to each other by the attachment structures 40 and are movable relative to each other as will be described in more detail below. In the example illustrated, the gear identification tool 34 includes four bodies 38. In some forms, the gear identification tool 34 may include more than four bodies 38 or less than four bodies 38 without departing from the scope of the present disclosure.

Figure 7A:
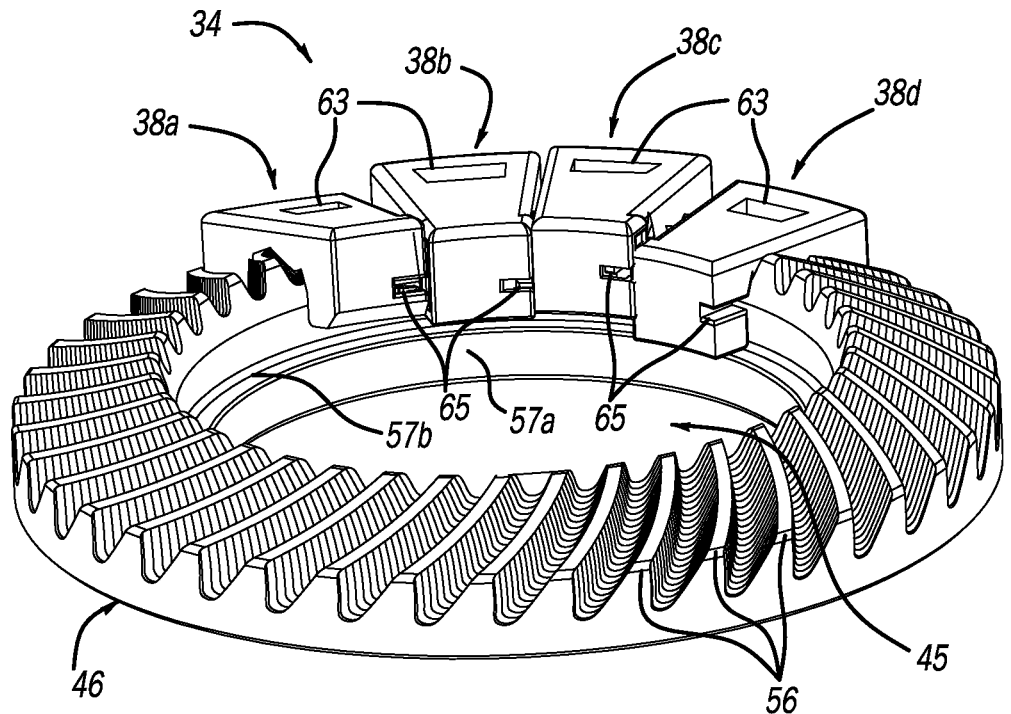
FIG. 7A is a perspective view of the gear identification tool of FIG. 2 disposed on a gear component according to the principles of the present disclosure.
Figure 7B:
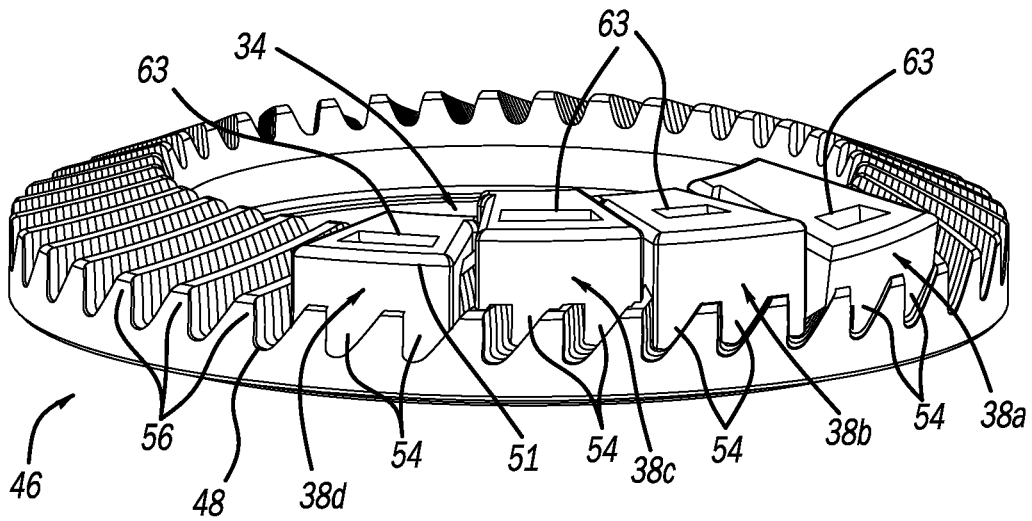
FIG. 7B is another perspective view of the gear identification tool of FIG. 2 disposed on the gear component according to the principles of the present disclosure.

Each body 38a, 38b, 38c, 38d of the gear identification tool 34 includes a plurality of sides 44a, 44b, 44c, 44d, 44e, 44f. When the gear identification tool 34 is disposed on the vehicle part 46, the side 44a of each body 38a, 38b, 38c, 38d is configured to be proximate or adjacent a counter bore 45 of the vehicle part 46 (FIG. 7A) and the side 44b of each body 38a, 38b, 38c, 38d is configured to be proximate or adjacent an outer circumferential surface 48 of the vehicle part 46 (FIG. 7B). In the example illustrated, each body 38a, 38b, 38c, 38d is tapered (FIGS. 2 and 3) from the side 44b toward the side 44a. The side 44a has an arcuate surface 49 and the side 44b has an arcuate surface 51. The side 44d of the body 38a, 38b, 38c, 38d is opposite the side 44c and has a flat surface.

Figure 4:
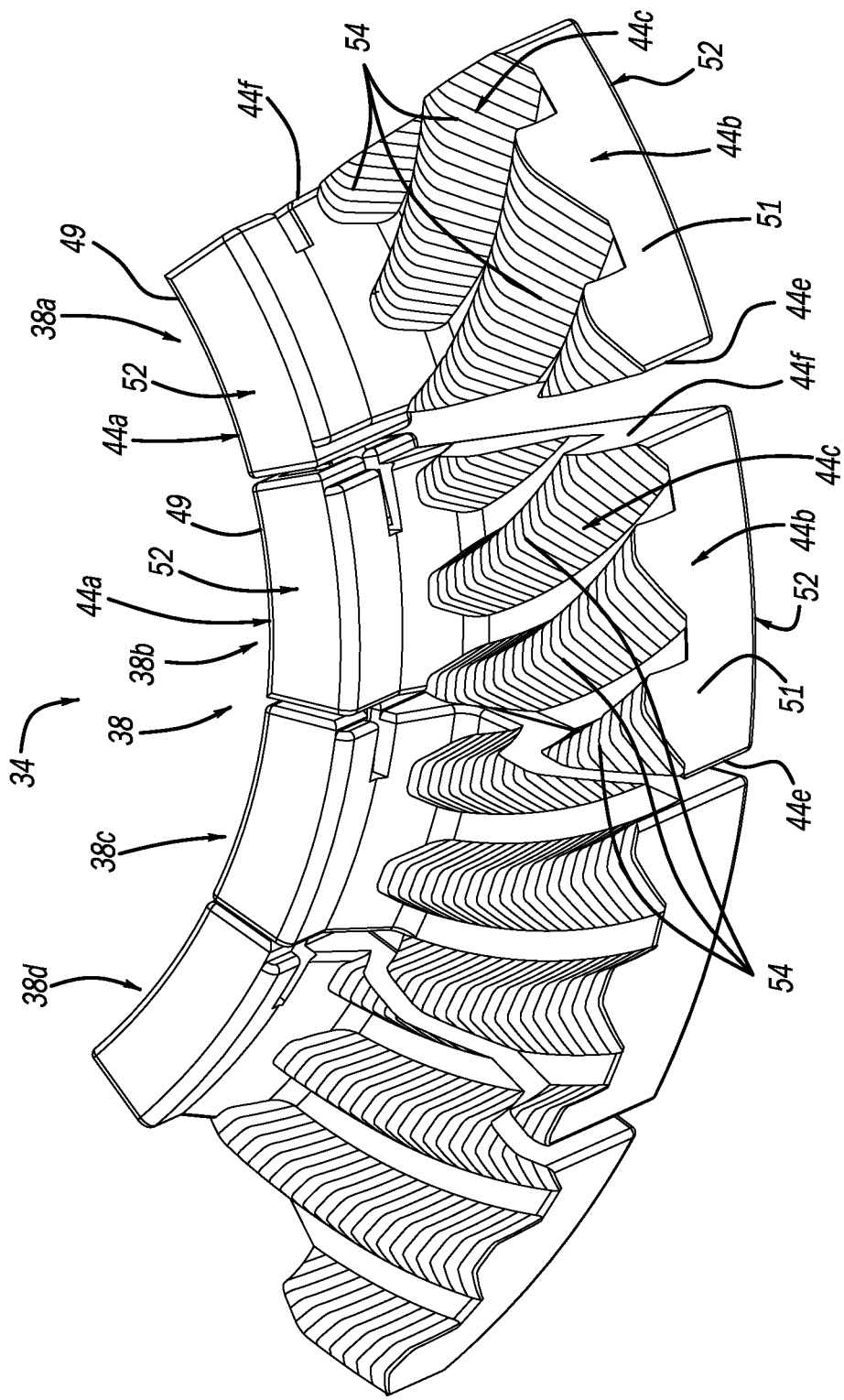
FIG. 4 is a perspective view of the gear identification tool of FIG. 2.

Each body 38a, 38b, 38c, 38d also includes a teeth engagement portion 50 and an attachment portion 52. When the gear identification tool 34 is on the vehicle part 46, the teeth engagement portion 50 is located closer toward the outer circumferential surface 48 of the vehicle part 46 than the attachment portion 52. Each body 38a, 38b, 380, 38d includes gear teeth 54 that are configured to engage gear teeth 56 of the vehicle part 46. The teeth 54 of a corresponding body 38a, 38b, 38c, 38d are located at the teeth engagement portion 50 at the side 44c of the corresponding body 38a, 38b, 38c, 38d (FIG. 4). The teeth 54 of each body 38a, 38b, 38c, 38d have a predetermined teeth profile that is different from each other and that is configured to mesh with a predetermined teeth profile of teeth of a matching vehicle part. For example, the predetermined teeth profile of the teeth 54 of body 38a is different from the predetermined teeth profiles of the teeth 54 of bodies 38b, 38c, 38d.

In this way, when the bodies 38a, 38b, 38c, 38d of the gear identification tool 34 are disposed on the vehicle part 46, the teeth 54 of the matching teeth profile will mesh and align with the teeth 56 of the vehicle part 46 while the teeth 54 of the other bodies 38 will not mesh or will be misaligned with the teeth 56 of the vehicle part 46. In the example illustrated, as shown in FIG. 7B, the teeth 54 of body 38d mesh with the teeth 56 of the vehicle part 46 while the teeth 54 of the other bodies 38a, 38b, 38c are misaligned and/or do not mesh with the teeth 56 of the vehicle part 46 (e.g., see visible gaps between the teeth 54 of the bodies 38a, 38b, 38c and the teeth 56 of the vehicle part 46).

The teeth profiles of the different bodies 38 may differ in any way or multiple ways, such as pitch, depth, shape, pressure angle, dimensions, size, thickness, gear diameter, and/or helix angle for example. The teeth profiles may be any suitable type of profile, such helical, hypoid, spiral, bevel, spur, rack, worm, for example. In the example provided, the teeth profiles are hypoid face gear profiles, though other configurations can be used. In one form, the different bodies 38 may have different types of teeth profiles, such as some bodies having hypoid while others have spiral and others have helical, for example.

When the gear identification tool 34 is on the vehicle part, the arcuate surface 49 of the side 44a of the matching body 38a, 38b, 38c, 38d may be flush with a circumferential surface defining a stepped opening of the vehicle part 46, thereby further assisting the operator in matching the body of the gear identification tool 34 with the vehicle part 46. The matching body 38a, 38b, 38c, 38d (i.e., the body 38d of FIG. 7A) also engages annual land 57b of the stepped opening 45 whereas a gap may exist between the other bodies 38a, 38b, 38c, 38d and the annular land 57b (i.e., a gap exists between the bodies 38a, 38b, 38c of FIG. 7A and the annular land 57b).

Figure 2:
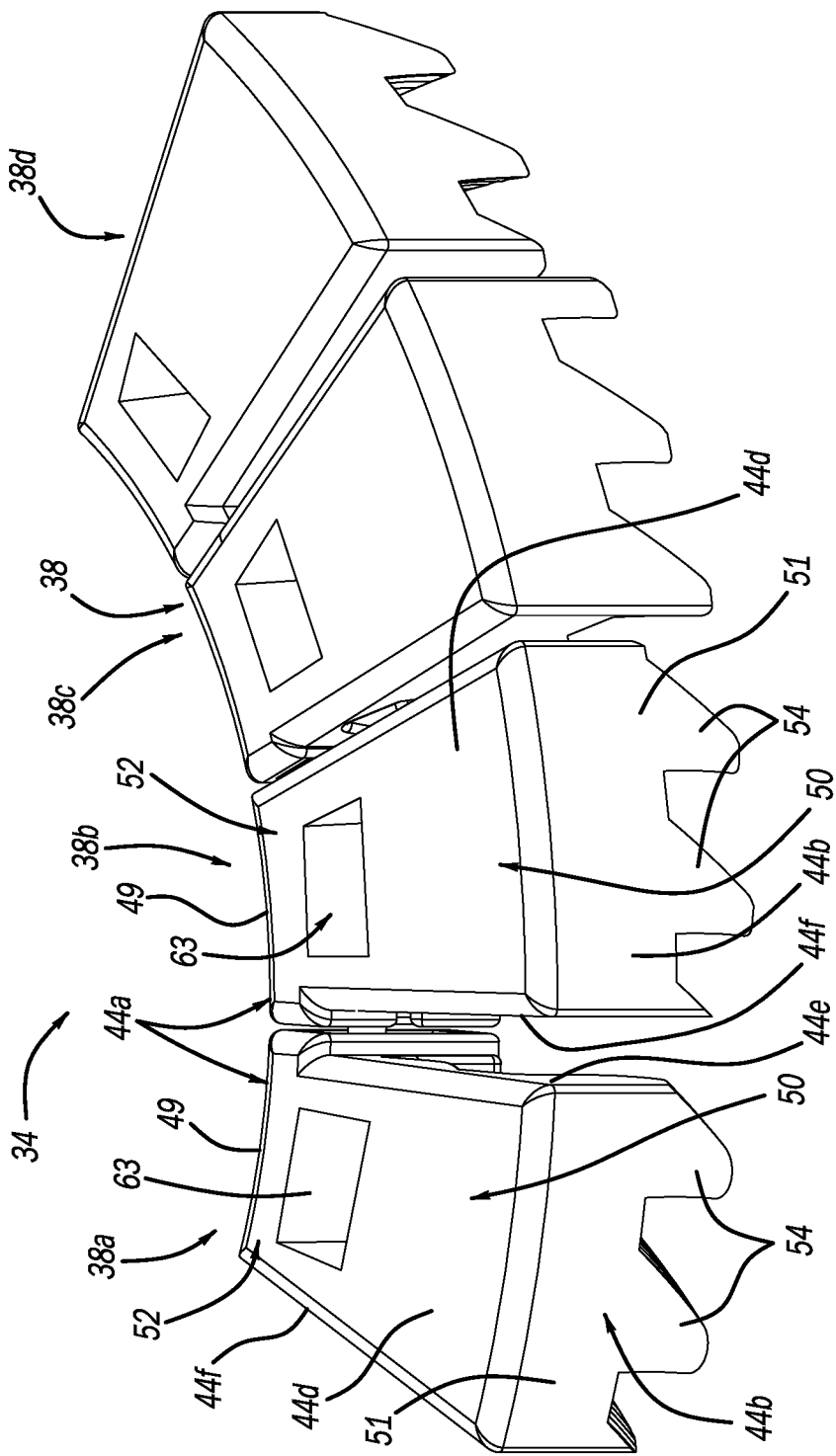
FIG. 2 is a perspective view of a gear identification tool according to the principles of the present disclosure.
Figure 3:
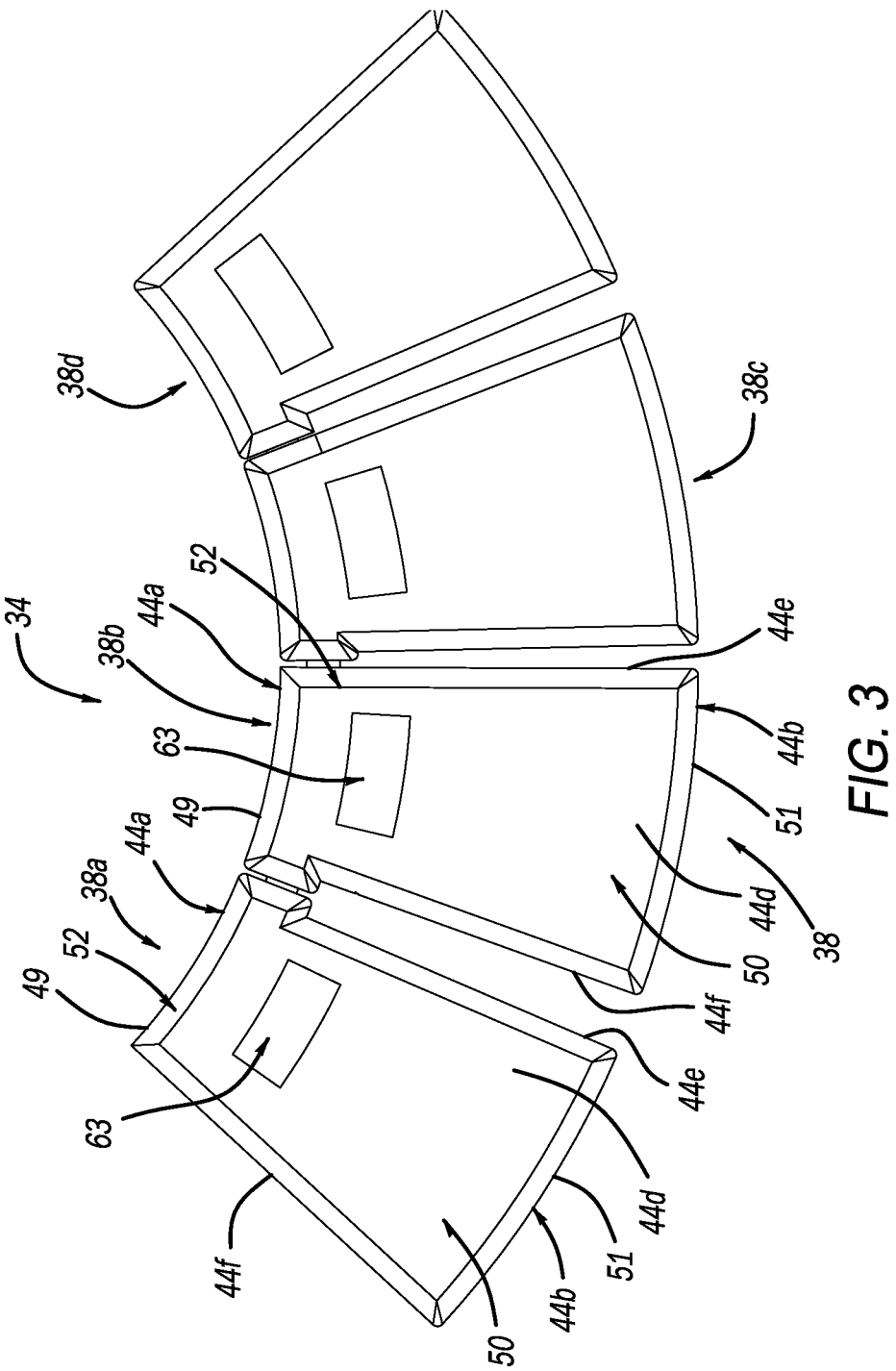
FIG. 3 is a top view of the gear identification tool of FIG. 2.

The bodies 38 of the gear identification tool 34 are coupled to each other at the attachment portions 52. Each body 38a, 38b, 38c, 38d further includes at least one slot 60a, at least one aperture 62a (FIG. 6), and an optional window 63 (FIGS. 2 and 3). The internal slot 60a formed in each body 38a, 38d (i.e., outermost bodies) is located near or at one of the sides 44e, 44f. The internal slot 60a is formed in the bodies 38 at the attachment portion 52. In the example illustrated, each body 38b, 38c (i.e., intermediate bodies) includes at least one additional slot 60b formed therein. That is, the internal slot 60a is formed in the body 38b, 38c near or at the side 44e and the internal slot 60b is formed in the body 38b, 38c near or at the side 44f. Each slot 60a, 60b extends in a vertical direction from the side 44c toward the side 44d. The aperture 62a of each body 38a, 38d is in communication with the internal slot 60a and opens through a respective side 44e, 44f of the body 38a, 38d. In the example illustrated, each body 38b, 38c includes an additional aperture 62b is in communication with the internal slot 60b and opening through the side 44f of the body 38b, 38c. The side 44f of one body 38 faces the side 44e of an adjacent body 38. For example, the side 44f of the body 38b faces the side 44e of the body 38c. In the example illustrated, the side 44e of the bodies 38a, 38b, 38c, 38d includes a flat surface and the side 44f of the bodies 38a, 38b, 38c, 38d includes a flat surface.

Figure 7C:
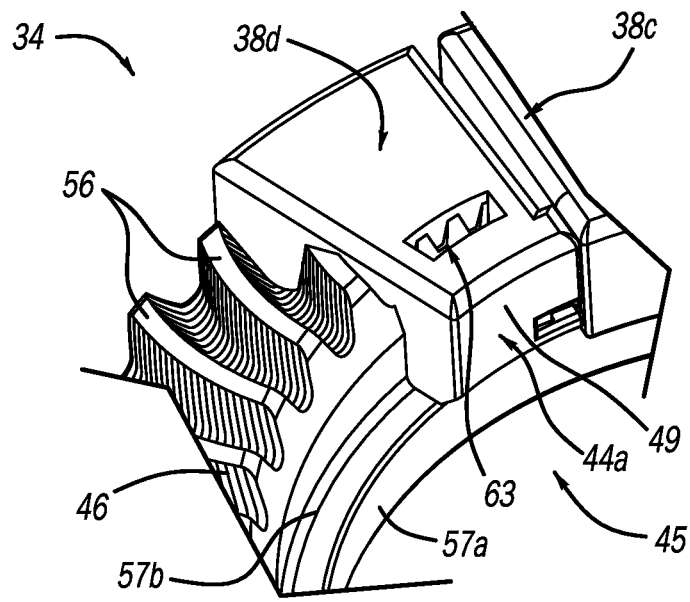
FIG. 7C is yet another perspective view of a portion of the gear identification tool of FIG. 2 according to the principles of the present disclosure.

In the example illustrated, the optional window 63 is formed in the side 44d of each body 38 and provides access to the teeth 54 located at the side 44c of the body 38. In this way, the operator has visual access of the teeth 54 of the bodies 38a, 38b, 38c, 38d engaging the teeth of the vehicle part and can visually confirm the body 38a, 38b, 38c, 38d that mesh with the teeth of the vehicle part. For example, as shown in FIG. 7C, the operator can visually confirm the teeth 54 of the body 38d meshing with the teeth 54 of the vehicle part 46. In the example illustrated, the window 63 has a rectangular-shape. In some forms, the window 63 may have a circular shape, square shape, or any other suitable shape that provides visual access of the teeth 54 of the bodies 38a, 38b, 38c, 38d engaging the teeth of the vehicle part. In some forms, one or more windows (not shown) may be formed in one or more sides 44a, 44b, 44e, 44f of the body 38, in addition to, or instead of, the window 63 formed in the side 44d of the body 38. In this way, the operator has multiple visual access points of the teeth 54 of the bodies 38 engaging the teeth of the vehicle part. For example, optional window 65 is formed in the side 44a of the body 38.

With reference to FIGS. 5 and 6, the attachment structures 40 extend between sides 44e, 44f of adjacent bodies 38. For example, the attachment structure 40a extends between the side 44e of body 38a and the side 44f of the body 38b. The attachment structures 40 permit the bodies 38 to move in a first direction X (FIG. 6) relative to each other and inhibit the bodies 38 from moving in a second direction Y (FIG. 6) relative to each other that is perpendicular to the first direction X. In this way, the bodies 38 of the gear identification tool 34 that do not match with the vehicle part may be misaligned in the first direction X relative to the matching body 38. For example, as shown in FIG. 7A, the bodies 38a, 38b, 38c are misaligned in the first direction X on the vehicle part 46 relative to the matching body 38d.

With reference to FIGS. 5 and 6, each attachment structure 40a, 40b, 40c is additively manufactured as a single, monolithic body. In some forms, each attachment structure 40 is manufactured using two or more separate parts that are assembled to each other. Each attachment structure 40a, 40b, 40c includes a first nut 66, a second nut 68, and a shaft 70 secured to the first and second nuts 66, 68.

The first nut 66 of the attachment structures 40a, 40b, 40c is movably disposed in the internal slot 60a of a respective body 38a, 38b, 38c. The second nut 68 of the attachment structures 40a, 40b is movably disposed in the internal slot 60b of bodies 38b, 38c while the second nut 68 of the attachment structure 40c is disposed in the internal slot 60a of the body 38d. The first nut 66 is disposed in the internal slot 60a such that the first nut 66 is allowed to move in the first direction X in the internal slot 60a and inhibited from moving in the second direction Y in the internal slot 60a. Similarly, the second nut 68 is disposed in a respective internal slot 60a, 60b such that the second nut 68 is allowed to move in the first direction X in the respective internal slot 60a, 60b and inhibited from moving in the second direction Y in the respective internal slot 60a, 60b. In this way, the bodies 38 are allowed to move in the first direction X relative to each other and inhibited from moving in the second direction Y relative to each other.

In the example illustrated, the first and second nuts 66, 68 have a square shape. In some forms, the first and second nuts 66, 68 may have a circular shape, an octagonal shape, or any other suitable shape that permits movement in the first direction X within the slot while inhibiting movement in the second direction Y within the slot. The shaft 70 securing the first and second nuts 66, 68 to each other inhibits the bodies 38 from moving in the second direction Y relative to each other. The shaft 70 also extends through the apertures 62a, 62b of adjacent bodies 38a, 38b, 38c, 38d. It should be understood that although the present disclosure provides the gear identification tool 34 for identifying vehicle parts, the gear identification tool 34 may also be used for identifying other type of parts such as parts of machinery, for example.

Figure 8:
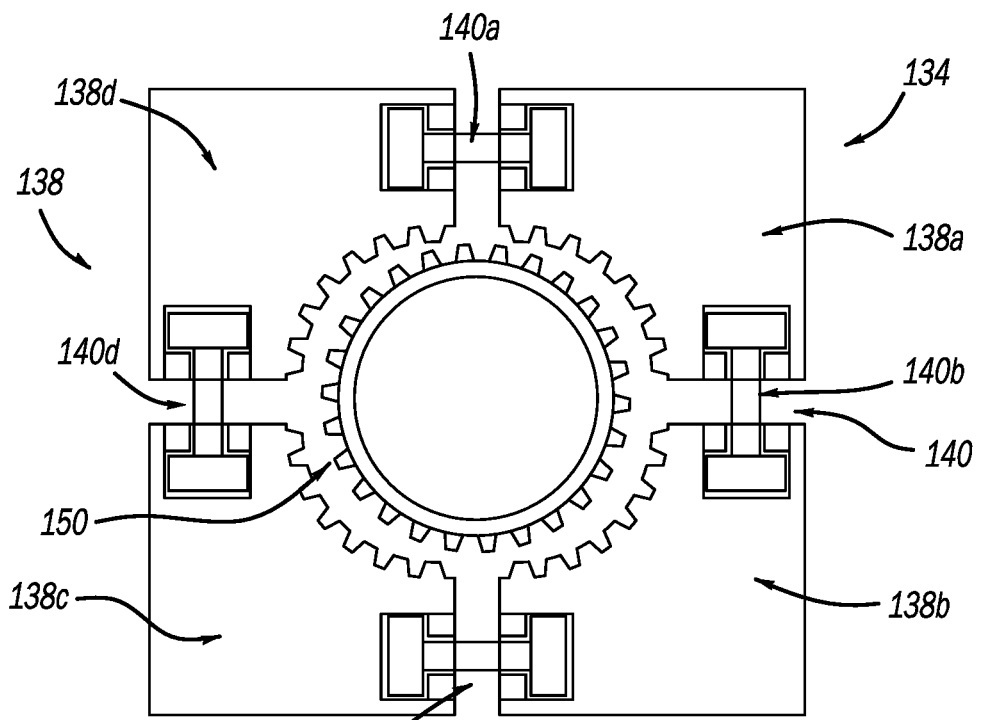
FIG. 8 is a top view of another gear identification tool according to the principles of the present disclosure.

With reference to FIG. 8, another gear identification tool 134 is provided. The structure and function of the gear identification tool 134 may be similar or identical to that of gear identification tool 34 described above, apart from any exception noted below. In the example illustrated, the gear identification tool 134 is a segmented assembly having a circular profile and including a plurality of bodies 138a, 138b, 138c, 138d (together referred to as the bodies 138) and attachment structures 140a, 140b, 140c, 140d (together referred to as the attachment structures 140).

The attachment structures 140 permit the bodies 138 to move in a radial direction relative to each other and inhibit the bodies 138 from moving in a axial direction relative to each other. In this way, the bodies 138 of the gear identification tool 134 that do not match with a vehicle part 150 (e.g., a splined shaft) are misalign on the vehicle part 150.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A gear identification tool comprising:
    a segmented assembly including a first body and a second body movable relative to each other, the first and second bodies coupled to each other by a first attachment structure, the first body including a plurality of first gear teeth configured to mesh with first predetermined gear teeth of a first gear, wherein the first gear teeth have a first teeth profile, the second body including a plurality of second gear teeth configured to mesh with second predetermined gear teeth of a second gear, wherein the second gear teeth have a second teeth profile that is different than the first teeth profile.

2. The gear identification tool of claim 1, wherein:
    the first body defines a first internal slot and a first aperture in communication with the first internal slot, the first aperture opens through a first side of the first body; and
    the second body defines a second internal slot and a second aperture in communication with the second internal slot, the second aperture opens through a second side of the second body.

3. The gear identification tool of claim 2, wherein the first attachment structure extends between the first side of the first body and the second side of the second body.

4. The gear identification tool of claim 1, wherein the first attachment structure permits the first and second bodies to move in a first direction relative to each other and inhibits the first and second bodies from moving in a second direction relative to each other, the second direction being perpendicular to the first direction.

5. The gear identification tool of claim 1, wherein the first attachment structure permits the first and second bodies to move within a predetermined distance relative to each other.

6. The gear identification tool of claim 1, wherein the first attachment structure includes:
    a first nut located in a first internal slot of the first body;
    a second nut located in a second internal slot of the second body; and
    a shaft secured to the first and second nuts.

7. The gear identification tool of claim 6, wherein the first attachment structure is a unitized structure.

8. The gear identification tool of claim 1, wherein the segmented assembly includes a third body coupled to the second body by a second attachment structure, and wherein the third body is permitted to move relative to the first and second bodies.

9. The gear identification tool of claim 8, wherein the third body includes a plurality of third gear teeth configured to mesh with third predetermined gear teeth of a third gear, the third gear teeth having a third teeth profile that is different than the first and second teeth profiles.

10. The gear identification tool of claim 1, wherein the first body has a first side including the first gear teeth and a second side opposite the first side, the second side comprising a window that provides access to the first teeth.

11. The gear identification tool of claim 1, wherein the segmented assembly has an arcuate profile disposed about a central axis, the first body extending a first angle relative to the central axis and the second body extending a second angle relative to the central axis.

12. The gear identification tool of claim 1, wherein the first and second gear teeth are face gear teeth.

13. A gear identification tool comprising:
a segmented assembly including a plurality of bodies coupled to each other by attachment structures and movable relative to each other, each body including a plurality of gear teeth configured to mesh with predetermined gear teeth of a respective gear,
wherein each body includes an internal slot and an aperture in communication with the internal slot, the aperture opens through a first side of the body, and
wherein one attachment structure of the attachment structures includes a first nut located in the internal slot of one body of the plurality of bodies, a second nut located in the internal slot of another body of the plurality of bodies, and a shaft secured to the first and second nuts.

14. The gear identification tool of claim 13, wherein the gear teeth of the one body of the plurality of bodies have a first teeth profile and the gear teeth of the another body of the plurality of bodies have a second teeth profile, and wherein the first gear teeth profile is different than the second teeth profile.

15. The gear identification tool of claim 13, wherein the one attachment structure permits the one body and the another body to move within a predetermined distance relative to each other.

16. The gear identification tool of claim 13, wherein the one attachment structure permits the one body and the another body to move in a first direction relative to each other and inhibits the one body and the another body from moving in a second direction relative to each other, the second direction being perpendicular to the first direction.

17. The gear identification tool of claim 13, wherein the one body has a second side including the gear teeth and a third side opposite the second side, and wherein the third side comprises a window that provides access to the gear teeth.

18. The gear identification tool of claim 13, wherein the segmented assembly has an arcuate profile disposed about a central axis, the one body extending a first angle relative to the central axis and the another body extending a second angle relative to the central axis.

19. The gear identification tool of claim 13, wherein the segmented assembly includes at least four bodies.

20. A gear identification tool comprising:
a segmented assembly including:
a plurality of bodies movable relative to each other, each body including a plurality of gear teeth having a gear teeth profile that is different from the gear teeth profile of the other bodies of the plurality of bodies, each body also including an internal slot and an aperture in communication with the internal slot, the aperture opens through a first side of the body; and
attachment structures coupling the plurality of bodies to each other, one attachment structure of the attachment structures includes a first nut located in the internal slot of one body of the plurality of bodies, a second nut located in the internal slot of another body of the plurality of bodies, and a shaft secured to the first and second nuts,
wherein the one attachment structure permits the one body and the another body to move in an axial direction relative to each other and inhibits the one body and the another body from moving in a radial direction relative to each other, and
wherein each of the plurality of bodies has a second side including the gear teeth and a third side opposite the second side, and wherein the third side comprises a window that provides access to the gear teeth.

* * * * *